United States Patent [19]

Sutter et al.

[11] Patent Number: 4,607,086

[45] Date of Patent: Aug. 19, 1986

[54] CONTINUOUS PROCESS FOR THE MANUFACTURE OF LOW-DENSITY POLYETHYLENE IN STIRRED AUTOCLAVES

[75] Inventors: Hubert Sutter, Leverkusen, Fed. Rep. of Germany; Karl-Uwe Haas; Winston P. Ledet, both of Victoria, Tex.

[73] Assignee: E. I. Du Pont de Nemours and Company, Wilmington, Del.

[21] Appl. No.: 207,562

[22] Filed: Nov. 17, 1980

Related U.S. Application Data

[63] Continuation of Ser. No. 27,456, Apr. 5, 1979, abandoned.

[51] Int. Cl.$^4$ .................. C08F 2/02; C08F 10/02
[52] U.S. Cl. .................................. 526/65; 526/66; 526/352.2
[58] Field of Search .................. 526/65, 66, 352.2

[56] References Cited

U.S. PATENT DOCUMENTS

| | | | |
|---|---|---|---|
| 2,868,762 | 1/1959 | Oakes | 525/240 |
| 2,897,183 | 7/1959 | Christl et al. | 526/352.2 |
| 3,178,404 | 4/1965 | Vaughn et al. | 526/65 |
| 3,536,693 | 10/1970 | Schrader et al. | 260/94.9 |
| 3,575,950 | 4/1971 | Gleason et al. | 260/94.9 |
| 3,692,763 | 9/1972 | Saane et al. | 260/94.9 P |
| 3,875,128 | 4/1975 | Suzuki et al. | 526/65 |
| 4,074,040 | 2/1978 | Oeder et al. | 526/352.5 |
| 4,085,266 | 4/1978 | Nakai et al. | 526/65 |
| 4,123,600 | 10/1978 | Kita et al. | 526/65 |

FOREIGN PATENT DOCUMENTS

710392 6/1970 Belgium .
1071305 6/1967 United Kingdom .

Primary Examiner—Edward J. Smith

[57] ABSTRACT

An improved continuous process for the manufacture of polymers of ethylene in autoclave reactors with practically complete back-mixing under pressure of from about 800 to about 2500 bars in the presence of free-radical-generating initiators is provided wherein (a) two autoclaves are connected in series in such a way that all the reaction product from the first reactor is fed to the second reactor, (b) each autoclave has a length/diameter (L/D) ratio of from about 1:1 to about 3:1, (c) the monomer(s) feed stream is divided between the two reactors such that when the temperature/concentration and/or pressure environment in the first reactor is different from that in the second reactor, the monomer(s) feed stream to the first reactor is equal to or greater than the monomer(s) feed stream to the second reactor, (d) the reaction temperatures in the two autoclaves are set such that when the temperature in the first reactor is different from that in the second reactor, the temperature in the first reactor is lower than the temperature in the second reactor, (e) the amount of initiator fed into each reactor being greater than 0.

1 Claim, 3 Drawing Figures

CONTINUOUS PROCESS FOR THE MANUFACTURE OF LOW-DENSITY POLYETHYLENE IN STIRRED AUTOCLAVES

This is a continuation of application Ser. No. 027,456, filed April 5, 1979, now abandoned.

BACKGROUND OF THE INVENTION

1. Field of the Invention

This invention relates to low-density polyethylene and more specifically, it relates to the manufacture of low-density polyethylene in stirred autoclaves.

2. DESCRIPTION OF THE PRIOR ART

The industrial high pressure processes for the manufacture of low-density polyethylene differ substantially only in the design of the reactors. Depending on the principle of their construction, the reactors are commonly classified as tubular reactors and (stirred) autoclaves.

Tubular reactors are characterized by a very high L/D ratio (L=length, D=diameter), values between 10,000 and 50,000 being the rule. As a result of this geometry, back-mixing of the material being reacted in such reactors is extremely slight, that is to say, a very close approximation to plug flow is achieved.

The stirred autoclaves in high-pressure polyethylene processes in general have a L/D ratio of <20. Back-mixing in such autoclaves is significantly affected by the L/D ratio. At L/D ratios of <3-4 and with a corresponding design of the stirrer, practically complete back-mixing is obtained. On the other hand, in the case of higher L/D ratios and when suitable inserts are used, back-mixing can be restricted in a controlled manner.

The degree of back-mixing is very important from two points of view: (a) process stability and (b) product properties.

Process stability is extremely important in high-pressure polyethylene processes because of the extreme reaction conditions during the manufacture of low-density polyethylene (pressure range of normally 1,500–3,000 bars and temperature range of 150°–300° C.), the high heat of polymerization of ethylene (approx. 800 kcal/kg or 3.3. MJ/kg) and the tendency of ethylene to decompose explosively at high pressures and temperatures between 300° and 400° C. (see Chemical Engineering Science, 1973, Vol. 28, 1,505–1,514).

Good control of such extreme reaction conditions thus makes a substantial contribution to process stability. For example, a high degree of process stability also means that the number of emergency blow-down to atmosphere and the associated dangers and consequences, such as ignition of the ethylene/air mixture and environmental pollution by noise and harmful substances, are substantially reduced. In addition to effective control instruments, such as sophisticated control loops for the temperature and pressure, it is primarily intense mixing in the reaction zone which assists control of the reaction, because it effects a rapid and uniform distribution of all the reactants. In this way, possible inhomogeneities in the reaction zone, which can result from incomplete mixing caused by fluctuations in metering and/or flow conditions, are excluded a priori and the formation of so-called "hot spots", which can be the starting point for the explosive decomposition of ethylene, is avoided.

According to prevailing opinion a reaction system exhibits practically complete back-mixing when the mixing time, i.e. the average duration of a mixing cycle, is equal to or less than a tenth of the average residence time of the reaction mixture.

The patent of Christl et al., U.S. Pat. No. 2,897,183, describes a constant environment reaction system in terms of end-to-end mixing of between 30 and 200 average number of cycles of the reacting mixture in accord with the equation: $NC=G_r/G_f$, in which NC is the number of cycles, Gr is the end-to-end circulation in pounds per hour, and Gf is the monomer(s) feed rate in pounds per hour. In the case of autoclaves, the degree of end-to-end mixing ("back-mixing") depends essentially on geometry of the vessel and the internal arrangement of the vessel (agitator, baffles, etc.). In tubular reactors, back-mixing is virtually prevented as a result of the design. However, complete back-mixing, which is desirable from the point of view of process stability and flexibility, entails some limitations with respect to certain product properties.

It is known that the end-use properties of low-density polyethylene are substantially influenced not only by the melt index and the density, which normally are set by the reaction parameters, that is to say the pressure, the temperature and the concentration of molecular weight regulator, but also by molecular factors, such as long-chain branching λ and non-uniformity $$U = \frac{Mw}{Mn} - 1$$

(Mw=weight average and Mn=number average molecular weight), and, in addition to the reaction parameters mentioned, reaction conditions attributable to the homogeneity or inhomogeneity of the reaction environment are responsible for these molecular factors (compare Die Angewandte Makromolekulare Chemie 40/41 (1974) 361–389 (No. 586)). Such reaction environments are characterized by the presence or absence of temperature gradients, concentration gradients and pressure gradients during the course of the reaction. Temperature gradients and concentration gradients are mutually interdependent and are the consequence of incomplete back-mixing. The pressure gradient is normally given by the lay-out of the reaction system and is restricted to tubular reactors. In the case of complete back-mixing (constant environment) none of the three gradients is possible.

A relationship between the temperature gradient, concentration gradient, and pressure gradient on the one hand and, on the other hand, the properties of the product arises from the fact that all the reaction steps involved in the polymerization, such as initiation reactions, growth reactions chain-transfer reactions and chain-stopping reactions, depend on the temperature, concentration and pressure in various ways. For example, a high concentration of polymer favors the long-chain branching λ which, in order to take place, requires the interaction of a free radical with a polymer chain. Under comparable reaction conditions (pressure, temperature and identical final conversion), more long-chain branches are consequently produced in a homogeneous reaction system with a constant polymer concentration (final concentration) than in an inhomogeneous reaction system in which the polymer concentration rises from a low initial value to the final value. The rheology, crystallizability, melt relaxation and other properties of the two products differ in spite of identical melt index.

For certain fields of application, for example, the melt-coating of paper, board, metal foils and the like, products having high values of λ and U are advantageous because their relaxation behavior leads to low "neck-in" values (narrowing of the melt curtain after leaving the extrusion equipment). In other fields of application, for example the blowing of thin film, products having low λ and U values are advantageous since they possess good rheological properties, drawability and optical properties.

This comparison demonstrates the influence of back-mixing in the reaction system on the product properties. In tubular reactors back-mixing is virtually prevented as a result of the design. In the case of autoclaves, the degree of back-mixing essentially depends on their geometry and their internal arrangement.

Although a practically completely back-mixed reaction system should be given preference from the point of view of process stability as far as certain product properties are concerned the arguments for a non-back-mixed reaction system prevail.

This knowledge has led to a number of proposals (U.S. Pat. Nos. 3,178,404; 3,536,693; 3,575,950; 3,692,763 and 3,875,128, British Patent Specification No. 1,071,305 and Belgian Patent Specification No. 710,392) with the aim of improving certain properties of the product by carrying out the polymerization in two or more reaction zones operating at differing (rising) temperatures. This is achieved largely by modifying the reactor to provide separate reaction zones, with no back-mixing in the reactor betweeen zones, for example by means of inserts and special types of stirrer. In order to obtain the temperature zones, U.S. Pat. No. 3,178,404 proposes a two-zone reactor with substantially no back-mixing between the zones as the preferred solution and, moreover, indicates the possibility of using an elongated tubular reactor or separate reactors. It is advantageous that the initiators employed for the different reaction zones have differing activities and are adapted to the particular temperatures. U.S. Pat. No. 3,178,404 claims the use of caprylyl peroxide for the reaction zone having the lower temperature (130°–190° C.). In the British Patent Specification No. 1,071,305 the combination of two slender autoclaves (L/D 11:1 to 20:1) is described which are operated under very different reaction conditions in such a way that the high-molecular weight reaction product of the first autoclave is led into the lower zone (mixing zone) of the second autoclave. ("wax reactor"). In U.S. Pat. No. 3,875,128 a combination of two or more slender autoclaves (L/D 5–20) is claimed with cooling units positioned between the autoclaves, in order to increase the conversion of the polymerization. The resulting considerable losses of pressure and possible formation of deposits in the coolers are taken into account.

The advantages of these proposals are, however, offset by two substantial disadvantages which are caused by the loss of practically complete back-mixing: 1. a reduction of process stability; 2. the loss of the possibility of producing products the optimum properties of which are achieved when the reactor is practically completely back-mixed.

SUMMARY OF THE INVENTION

It has now been found that the desirable product properties as obtainable with tubular reactors can be achieved without loss of the process and product advantages of a process with practically complete back-mixing, by operating two specially designed autoclaves in series and with practically complete back-mixing in each. The present invention provides an improved continuous process for the manufacture of polymers of ethylene in autoclave reactors with practically complete back-mixing under pressure of from about 800 to about 2500 bars in the presence of free-radical-generating initiators, the improvement comprising (a) two autoclaves being connected in series in such a way that all the reaction product from the first reactor is fed to the second reactor, (b) each autoclave having a length/diameter (L/D) ratio of from about 1:1 to about 3:1 (c) the monomer(s) feed stream being divided between the two reactors such that (1) when the temperature/concentration and/or pressure environment in the first reactor is different from that in the second reactor, the monomer(s) feed stream to the first reactor is equal to or greater than the monomer(s) feed stream to the second reactor, or (2) when the temperature/concentration environment is the same in both reactors, the monomer(s) feed stream can be divided as desired, (d) the reaction temperatures in the two autoclaves being set such that (1) when the temperature/concentration environment in the first reactor is different from that in the second reactor, the temperature in the first reactor is lower than the temperature in the second reactor, or (2) when the temperature/concentration environment is the same in both reactors, the reaction temperature in the first reactor is the same as the reaction temperature in the second reactor, (e) the initiator for the first reactor being identical with or different from the initiator for the second reactor and the amount of initiator fed into each reactor being greater than 0.

DETAILED DESCRIPTION OF THE INVENTION

Depending on the objective, the reaction system of the present invention makes it possible to set reaction conditions which correspond either to a system having temperature, concentration and pressure gradients or to a constant environment system. Moreover, it is possible to change from one set of operating conditions to another or to change from the operating conditions of temperature, concentration and pressure gradients to the operating conditions of a constant environment system or vice versa, without having to shut down the installation or interrupt the reaction.

It has now been found that a constant environment system can be achieved without providing alternative piping for connecting the autoclaves in parallel and without the disadvantages associated therewith, such as the mounting of fittings, temporary shut-down of parts of the piping which creates the danger of dead spaces and complex manipulations during the changeovers and associated disturbances.

The high process stability of the reaction system described, as compared with multi-chamber reactors or tube reactors, is ensured by both the practically complete back-mixing and the individual control instruments and protective instruments of each reactor and is not inferior to that of a well-mixed single autoclave.

Figure 1:
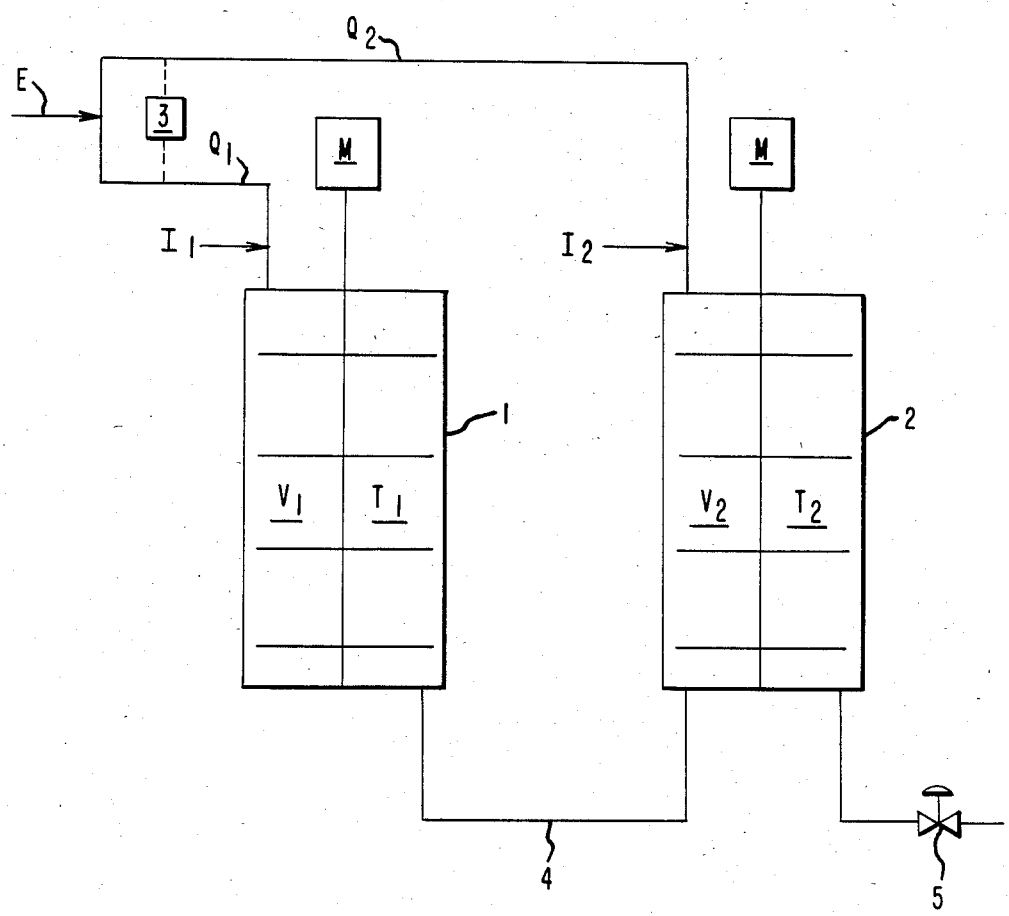
FIG. 1 is a schematic diagram of the flowsheet of the present process.

The process according to the invention is thus distinguished by a high flexibility in respect of the product grades which can be manufactured by the process, high process stability and hence low environmental pollution, and by ease of management. Its mode of operation may be explained in more detail by reference to FIG. 1.

The feed ethylene E, which can contain comonomers, such as vinyl acetate, butene-1 and the like, as well as molecular weight regulators, such as hydrogen, ethane, propane and the like, and which, depending on the requirements of the reaction, is under a pressure of from 1,000 to 3,000 bars and at a temperature of from $-20°$ C. to $100°$ C., is split, by a ratio controller 3, into the two monomer feed streams Q1 and Q2 which pass to the reactors 1 and 2 respectively. (M designates the stirrer drives.) The reaction mixture from reactor 1 passes via the connecting line 4 into the reactor 2 and the reaction mixture from the reactor 2 passes via the pressure controller 5 into collecting equipment for separating the reaction mixture. The nature and quantity of the initiators I1 and I2, which are fed into the two streams Q1 and Q2 immediately before the latter enter into the reactors 1 and 2 respectively, are adapted to the particular requirements of the reaction.

Figure 3:
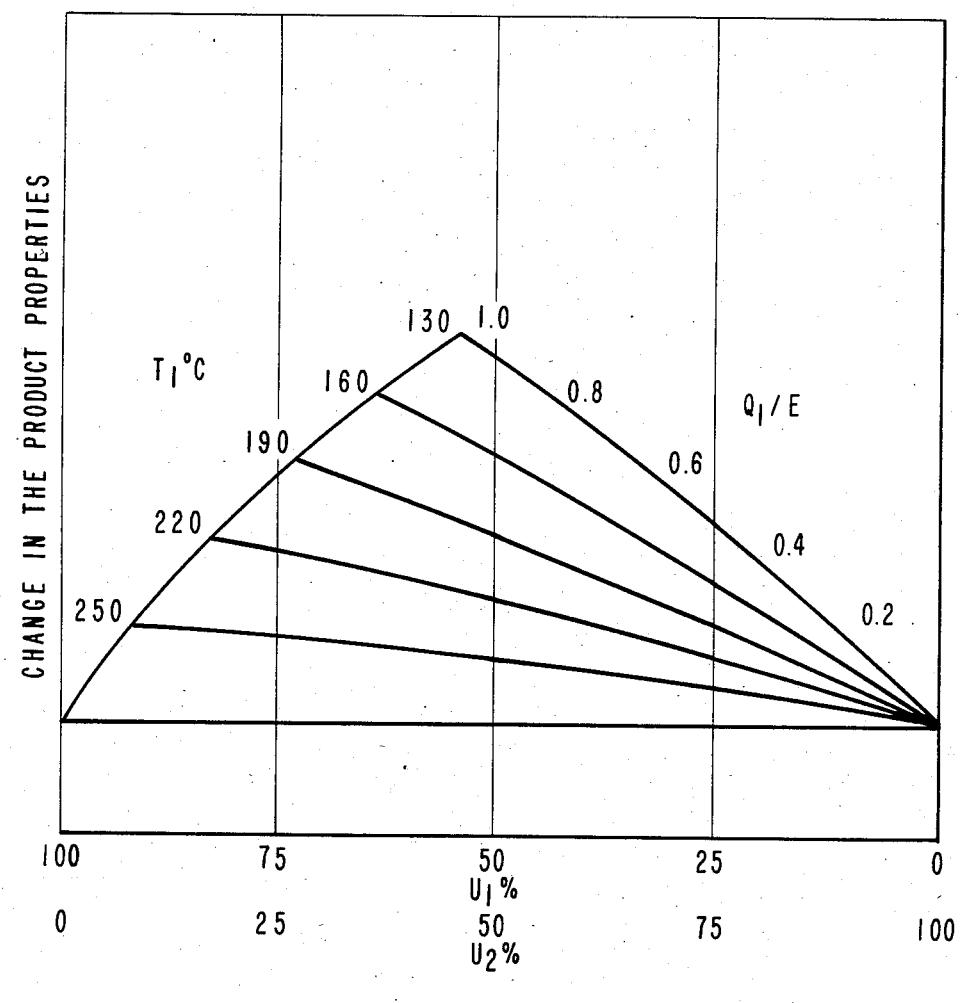
FIG. 3 is a graph illustrating the relationship between temperature, concentration and conversion gradient, and product properties obtained by the present process.

Depending on the desired product properties, the total reaction system can be operated either as a system with temperature, concentration and pressure gradients or as a constant environment system. For a reaction system with temperature and concentration gradients the two streams Q1 and Q2 are adjusted in such a way that Q1>Q2, and the reaction temperatures T1 and T2 (in R1 and R2 respectively) are selected according to requirements, T2 always being >T1. The nature and amount of the initiators I1 and I2 are adapted to the reaction temperatures T1 and T2, respectively. In order to increase the differences in the properties of the products obtained in the two reactors the properties of the products obtained in the two reactors the process according to the invention can also be operated with an adjustable pressure gradient between the two reactors (not shown in FIG. 1), the pressure in the first reactor being higher than the pressure in the second reactor. All the variation possibilities mentioned can either be put into use independently or in combination with each other. The changes in product properties which can be achieved by means of a temperature and concentration gradient are the more pronounced, the larger the difference between the reaction temperatures T1 and T2 and the smaller the stream Q2. The relation between these factors as well as the influence of the conversion gradient on the product properties is illustrated in FIG. 3. Temperature ranges of $120°-220°$ C. and $190°-280°$ C. are preferred for T1 and T2, respectively. A change in the temperature difference between T2 and T1 or a change in the ratio of the two feed streams influences the spectrum of properties in differing ways. For a constant environment system the reaction temperatures T1 and T2 are brought to the same value. Although the splitting of the streams Q1 and Q2 is not critical in this case, for maximum initiator-efficiency it is preferably selected in such a way, that the ratio Q1/Q2 is equal to the volume ration V1/V2 of the reactors. In that case, the initiators I1 and I2 are normally chemically identical.

The flexibility of the process according to the invention can be further extended by numerous possible variations. For example, the streams Q1 and Q2 can be cooled or heated differently in order to exert an additional influence on the conversion gradient. A comparable influence can also be attained by cooling the connecting line 4. Such measures allow additional variation of these differences between the properties of the products of reactors 1 and 2 which can be influenced by temperature and conversion gradients as well as of the relative quantities of the products formed in each reactor.

The examples which follow are intended to explain the process according to the invention in more detail. For all the examples two practically completely mixed stirred autoclaves are employed, which are connected to one another according to the scheme shown in FIG. 1.

In examples 1-5 and the first comparative example, two autoclaves of the same size having an L/D ratio of 2.6 are used. In examples 6-10 and the second comparative example, the first reactor has a volume of 0.725 liters and L/D of 1.1; the second reactor has a volume of 0.325 liters and an L/D of 1.0. In the two comparative examples only the first reactor is used. The ethylene feed rate, E, is kept constant at 120 kg/h in examples 1-5 and in the first comparative example; in examples 6-10 and the second comparative example, E is 13 kg/h. The other reaction parameters and the results are shown in Tables I and II.

The following examples are given for the purpose of illustrating the present invention. All parts and percentages are by weight unless otherwise specified.

EXAMPLE 1

This example demonstrates that the process according to the invention can be operated as a constant environment reaction system. A comparison of the product properties for Example 1, indicated in the summarizing Table II, with those of the comparative example, confirms the equivalence of products manufactured in the two examples by differing technologies.

EXAMPLES 2-5

These examples show the influence of different reaction temperature gradients and of different ratios of the feed streams on the properties of the products.

EXAMPLES 6-10

Figure 2:
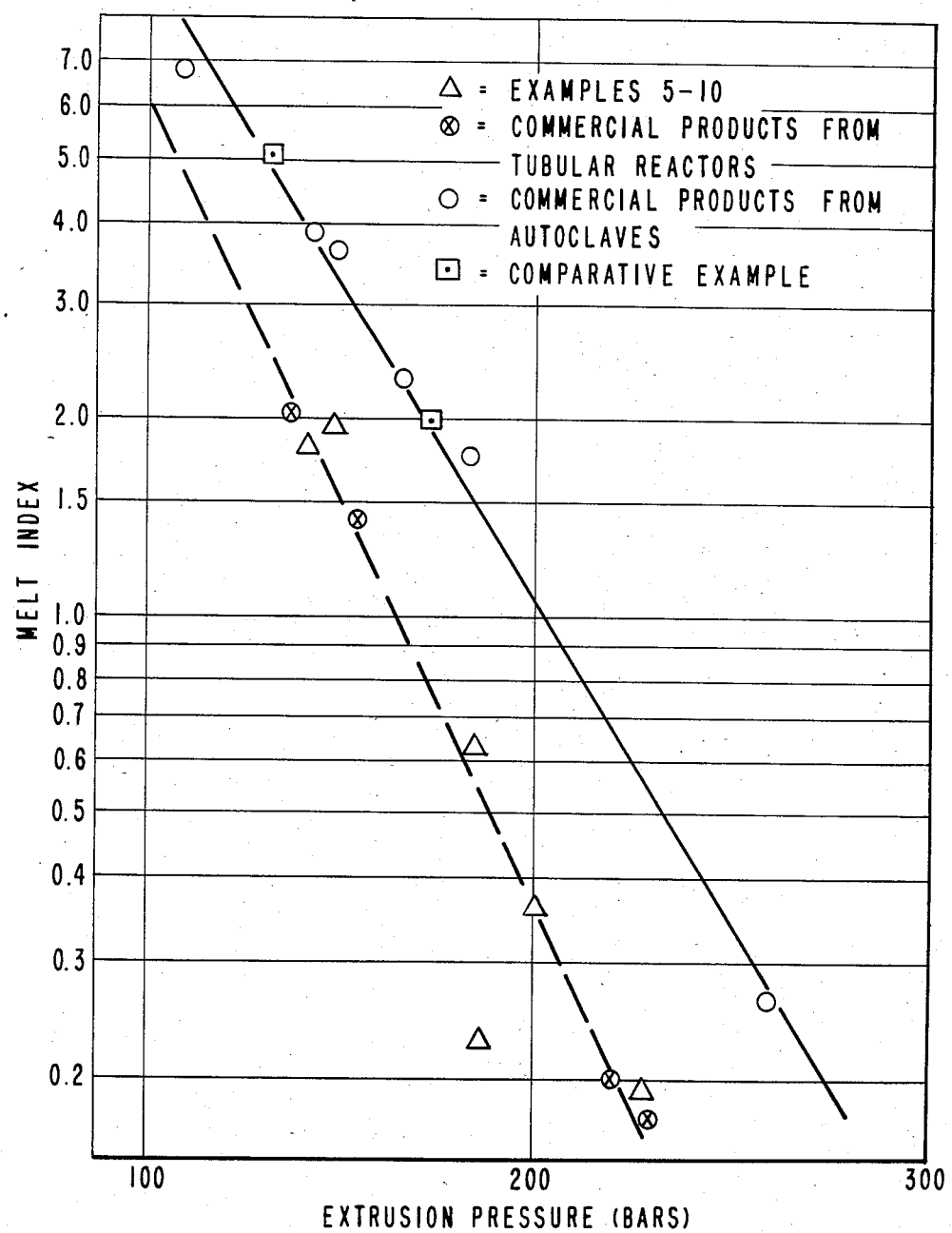
FIG. 2 is a graph illustrating the relationship between extrusion pressure and melt index for polymers prepared by commercial tubular processes, commercial single-autoclave processes and the process of the present invention.

These examples demonstrate that when the process according to the invention is operated under conditions producing a temperature/conversion gradient, certain product properties differ substantially from those obtained with a single autoclave and approach, to a surprising degree, the values obtained using a tubular process. This effect is illustrated, using the relationship between extrusion pressure and Melt Index, in FIG. 2, where data for commercial products made in tubular processes are compared with data for commercial products made in constant environment single-autoclave processes and with data from examples 6-10 and 5. As can be seen the data for these examples fall on the same line as the data for the products from tubular reactors.

TABLE I

Reaction Parameters

| Example | $T_E$[1] °C. | $T_{R1}$[1] °C. | $T_{R2}$[1] °C. | Pressure bars | Q1[2] E | Initiator[3] I1 | Initiator[3] I2 | Conversion in R1 % | Concentration of molecular weight regulator[4] mol % |
|---|---|---|---|---|---|---|---|---|---|
| Comparison | 20 | 260 | — | 1800 | 1,0 | PN | — | 100 | 0,9 Pr |
| 1 | 20 | 260 | 260 | 1800 | 0,5 | PN | PN | 50 | 0,9 Pr |
| 2 | 20 | 260 | 260 | 1800 | 0,6 | PN | PN | 60 | 0,5 Pr |
| 3 | 20 | 210 | 260 | 1800 | 0,6 | PO | PN | 48 | 1,4 Pr |
| 4 | 20 | 160 | 260 | 1800 | 0,6 | PD | PN | 35 | 1,9 Pr |
| 5 | 20 | 160 | 260 | 1800 | 0,95 | PD | PN | 55 | 2,7 Pr |
| 6 | 40 | 160 | 250 | 1450 | 1,0 | PL | PZ | 57 | 1,5 Cy |
| 7 | 40 | 160 | 250 | 1860 | 1,0 | PL | PZ | 57 | 1,1 Pr |
| 8 | 40 | 160 | 250 | 1860 | 1,0 | PL | PZ | 57 | 2,5 Cy |
| 9 | 85 | 170 | 250 | 1860 | 1,0 | PL | PZ | 52 | 0,7 Pr |
| 10 | 43 | 160 | 280 | 1860 | 1,0 | PL | PZ | 49 | 1,2 Cy |
| Comparison | 31 | 217 | — | 1860 | 1,0 | PB | — | 100 | 1,1 Cy |

[1]$T_E$, $T_{R1}$, $T_{R2}$ denote the feed temperature and reaction temperatures in autoclaves 1 and 2, respectively
[2]Q1 = feed stream to autoclave 1; E = total feed stream
[3]PN = t-butyl pernonanoate; PO = t-butyl peroctoate; PD = t-butyl porneodecanoate; PL = t-butyl perpivalate; PZ = di-t-butyl peroxide; PB = t-butyl perisobutyrate
[4]Pr = propylene, Cy = Cyclohexne; content of extraneous regulator in the feed stream 0.05 mol %;

TABLE II

Product properties

| Example | MI2 g/10 min | Density g/cm³ | melt[1] swell % | Extrusion pressure[2] bars | Gloss at 20° % | Drawability[5] | [3] | Surface[4] roughness μm |
|---|---|---|---|---|---|---|---|---|
| comparison | 5,1 | 0,917 | 136 | 127 | — | — | 0,186 | 1,6 |
| 1 | 5,0 | 0,917 | 137 | 126 | — | — | 0,186 | 1,5 |
| 2 | 1,79 | 0,917 | 133 | 164 | — | 90 | 0,213 | 2,2 |
| 3 | 1,81 | 0,919 | 130 | 152 | 10 | 45 | 0,190 | 1,2 |
| 4 | 1,80 | 0,919 | 128 | 140 | 23 | 30 | 0,178 | 0,7 |
| 5 | 1,81 | 0,921 | 125 | 138 | 48 | 25 | 0,155 | 0,5 |
| 6 | 0,36 | 0,923 | 114 | 198 | 1,5 | 4,6 | — | — |
| 7 | 0,63 | 0,924 | 114 | 183 | 25 | 7,6 | — | — |
| 8 | 1,95 | 0,929 | 116 | 145 | 21 | 15 | — | — |
| 9 | 0,19 | 0,922 | 103 | 228 | 16 | 4,6 | — | — |
| 10 | 0,23 | 0,923 | 99 | 186 | — | 3,7 | — | — |
| comparison | 2,0 | 0,928 | 114 | 169 | 42 | 12 | — | — |

[1]Swelling of the molten extrudate during the MI measurement (large values denote a small "neck-in" in the extrusion of flat films)
[2]Measured under standard conditions in an extrusiometer in examples 1–5 and during manufacture of blown film in examples 6–10.
[3]Long-chain branches per 1,000 C atoms.
[4]Measured under standard conditions on a strand from the high-pressure capillary viscometer.
[5]In examples 2–5 the film drawability was measured as strand thickened at break in microns; in examples 6–10 and the second comparative example the draw rate was measured in m/min. until the break of the strand in the extrusiometer test.

We claim:

1. An improved continuous process for the manufacture of polymers of ethylene in autoclave reactors, each with a constant environment, under pressure of from about 800 to about 2500 bars in the presence of a free radical-generating initiator, the improvement comprising (a) two autoclaves being connected in series such that all the reaction product from the first reactor is fed to the second reactor there being no means of positive heat removal from the reaction product between said two autoclaves, and both autoclaves being operated at about the same pressure, (b) each autoclave having a length/diameter (L/D) ratio of from about 1:1 to about 3:1, (c) the initiator for the first reactor being identical with or different from the initiator for the second reactor and the amount of initiator fed into each reactor being greater than 0, wherein both reactors are operated at the same conditions and the ratio of the total monomer(s) feed stream to the first and second reactors is equal to the ratio of the reaction volumes of the first and second reactors.

* * * * *